C. LE G. FORTESCUE.
RECTIFIER EQUALIZING SYSTEM.
APPLICATION FILED MAY 6, 1915.
1,270,805.
Patented July 2, 1918.
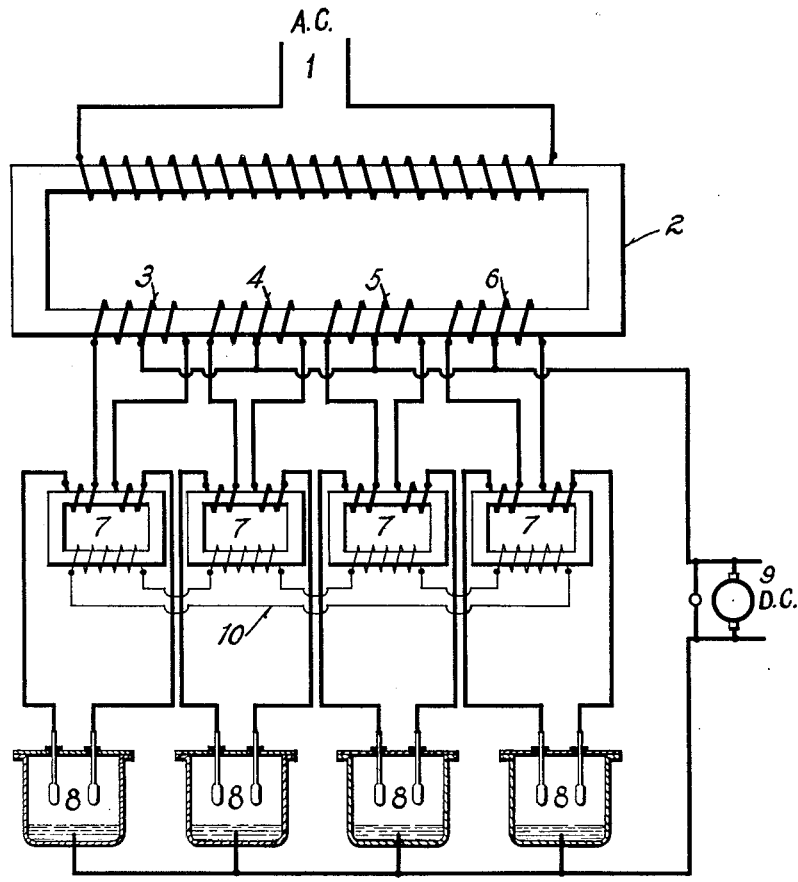
WITNESSES:
R.J. Fitzgerald
D.C. Davis.
INVENTOR
Charles LeG. Fortescue
BY
ATTORNEY

UNITED STATES PATENT OFFICE.

CHARLES LE G. FORTESCUE, OF PITTSBURGH, PENNSYLVANIA, ASSIGNOR TO WESTINGHOUSE ELECTRIC AND MANUFACTURING COMPANY, A CORPORATION OF PENNSYLVANIA.

RECTIFIER-EQUALIZING SYSTEM.

1,270,805.             Specification of Letters Patent.        Patented July 2, 1918.

Application filed May 6, 1915. Serial No. 26,435.

*To all whom it may concern:*

Be it known that I, CHARLES LE G. FORTESCUE, a subject of the King of Great Britain, and a resident of Pittsburgh, in the county of Allegheny and State of Pennsylvania, have invented a new and useful Improvement in Rectifier-Equalizing Systems, of which the following is a specification.

My invention relates to systems of distribution that are adapted to be employed in connection with rectifiers, and it has for its object to provide means whereby a plurality of rectifying devices, operating in parallel with each other upon a given load, may each assume and maintain a definite portion of said load.

The single figure of the accompanying drawing is a diagrammatic view of a plurality of rectifiers of the vapor arc type together with their attendant supply, equalizing and load circuits.

In the operation of rectifiers of the vapor arc type, considerable difficulty has been experienced in causing two of said devices to operate in parallel with each other upon a given load because of the fact that a vapor arc acts as a conductor of the second class. When, therefore, a single rectifier, for any reason, becomes more highly heated than the other rectifiers, its resistance falls by a proportional amount and it takes more current and assumes a still higher temperature, and this process goes on, if unchecked, until the entire load flows in a single rectifier. By my invention, I inductively interlink the supply circuits of a plurality of rectifiers so that a disproportionate amount of energy supplied to any one rectifier will decrease the voltage to said rectifier, at the same time increasing the voltage supplied to the remaining rectifiers, thus maintaining equilibrium and a predetermined load distribution.

Referring to the accompanying drawing for a more detailed understanding of my invention, a pair of mains 1 are connected to any suitable source of single-phase alternating current. Energy derived from the mains 1 flows through a suitable transformer 2 to a plurality of secondary windings 3, 4, 5 and 6, each of which is associated with an auxiliary transformer 7—7 and with a rectifier 8—8, preferably of the vapor arc type. Each of the auxiliary transformers 7—7 is provided with a pair of primary windings which are connected, respectively, in leads from the terminals of the associated secondary winding of the transformer 2 to the anodes of the corresponding rectifier 8. The two halves of said primary windings on the transformer 7—7 are so wound as to produce flux in opposite directions when energized by unidirectional current impulses flowing to the rectifying devices. The cathodes of the rectifiers 8—8 are all connected to one terminal of a suitable load circuit 9, the other terminal of which is connected to the mid point of the secondary windings of the transformer 2, as is customary in the rectifier art. Each of the transformers 7—7 is provided with a secondary winding and all of said secondary windings are connected in series relation with each other by means of a suitable auxiliary equalizing circuit 10.

Having thus described the structure of my invention, the operation is as follows: Upon starting the rectifiers 8—8 by any suitable means, unidirectional current impulses flow alternately in the two halves of the primary winding of each of the transformers 7—7 and induce electromotive forces in the secondary windings thereof.

When each of the rectifiers 8—8 is carrying the same load, each of the transformers 7—7 will act as a current transformer and there will be a flow of current in the circuit 10 determined by the primary load current and the ratio of transformation. If now, for any reason, one of the rectifiers assumes more than its proper share of the total load, the associated transformer will develop a small choking or counter electromotive force effect and lower the voltage applied thereto. At the same time the voltage applied to the remaining rectifiers will be slightly raised and proper division of the load will be regained.

While I have shown my invention as applied to rectifiers of equal capacity, it may be applied to maintain a predetermined load distribution between rectifiers of unequal capacity by suitable proportioning of the transformers 7—7.

While I have shown my invention in its preferred form, it is obvious to those skilled in the art that it is susceptible of various minor changes and modifications without departing from the spirit thereof, and I desire, therefore, that no limitation shall be placed thereupon except such as are imposed by the prior art or are specifically set forth in the appended claims.

I claim is my invention:

1. The combination with a direct current consumption circuit, of a plurality of rectifiers for supplying current thereto, and means providing an auxiliary load-distributing circuit interlinked therewith for adjusting the relative loads on each of said rectifiers in accordance with a predetermined ratio.

2. The combination with a direct current consumption circuit, of a plurality of rectifiers connected to supply current thereto, means for supplying alternating current to said rectifiers, and an auxiliary circuit inductively interlinked with the alternating current connections of each of said rectifiers for maintaining a predetermined load distribution therebetween.

3. The combination with a plurality of rectifiers, of connections for supplying alternating current thereto, a transformer associated with each of said rectifiers and having its primary winding inserted in the alternating current connections thereof, and a circuit connecting the secondary windings of all of said transformers, whereby the relative loads on said rectifiers will be adjusted in accordance with a predetermined ratio.

4. The combination with a plurality of rectifiers, each of which is provided with a plurality of anodes, of an alternating current lead connected to each of said anodes, a transformer core associated with each of said rectifiers, a primary winding inserted in each alternating current lead, all of the primary windings associated with each rectifier being mounted on a corresponding core, a secondary winding on each of said transformer cores and an auxiliary circuit connecting all of said secondary windings in series relation.

In testimony whereof, I have hereunto subscribed my name this 29th day of April, 1915.

CHARLES LE G. FORTESCUE.